(12) United States Patent
Hayoun et al.

(10) Patent No.: US 12,274,967 B2
(45) Date of Patent: Apr. 15, 2025

(54) AIR FILTER FOR A PAINTING BOOTH USED FOR SPRAY COATING

(71) Applicant: UCUBE LAB SA, Geneva (CH)

(72) Inventors: Patrick Alain Joseph Hayoun, Dubai (AE); Michel Carbonara, Attalens (CH)

(73) Assignee: UCUBE LAB SA, Geneva (CH)

( * ) Notice: Subject to any disclaimer, the term of this patent is extended or adjusted under 35 U.S.C. 154(b) by 0 days.

(21) Appl. No.: 17/769,658

(22) PCT Filed: Oct. 16, 2020

(86) PCT No.: PCT/EP2020/079278
§ 371 (c)(1),
(2) Date: Apr. 15, 2022

(87) PCT Pub. No.: WO2021/074426
PCT Pub. Date: Apr. 22, 2021

(65) Prior Publication Data
US 2024/0123389 A1 Apr. 18, 2024

(30) Foreign Application Priority Data
Oct. 17, 2019 (LU) ........................................ 101440

(51) Int. Cl.
*B01D 46/52* (2006.01)
*B01D 45/04* (2006.01)
(Continued)

(52) U.S. Cl.
CPC ........... *B01D 46/522* (2013.01); *B01D 45/06* (2013.01); *B01D 46/121* (2022.01); *B01D 50/20* (2022.01); *B05B 14/43* (2018.02)

(58) Field of Classification Search
CPC .... B01D 46/10; B01D 46/52; B01D 46/0001; B01D 46/521; B01D 46/06; B01D 46/121;
(Continued)

(56) References Cited

U.S. PATENT DOCUMENTS 3,075,337 A * 1/1963 Andreae ................. F24F 13/28
55/446
4,952,221 A * 8/1990 Morioka ................. B05B 14/46
261/112.1
(Continued)

FOREIGN PATENT DOCUMENTS

WO 9413387 A1 6/1994

OTHER PUBLICATIONS

International Search Report for corresponding PCT application No. PCT/EP2020/079278, mailed Nov. 18, 2020.
(Continued)

*Primary Examiner* — Minh Chau T Pham
(74) *Attorney, Agent, or Firm* — Sandberg Phoenix & von Gontard, P.C.

(57) ABSTRACT

Air filter for spray coating, having: a housing designed for showing a cuboid shape, with a face forming an air inlet and an opposed face forming an air outlet; one or more accordion panels with fold lines, to be accordion folded about said fold and to be located in the housing for forming a filtering barrier; the one or more accordion panels of the filtering barrier having at least one pair of flap portions configured to be folded to form a converging profile followed aeraulically by a trapping chamber formed by one of the accordion panels, and openings forming escape lateral passages of the trapping chamber(s).

14 Claims, 5 Drawing Sheets

(51) Int. Cl.
*B01D 45/06* (2006.01)
*B01D 46/121* (2022.01)
*B01D 50/20* (2022.01)
*B05B 14/43* (2018.01)

(58) Field of Classification Search
CPC .... B01D 2265/06; B01D 45/04; B01D 50/20; B05B 14/43
USPC ......... 55/496–500, 444, 446, 482, 486, 521, 55/DIG. 31, DIG. 46; 264/DIG. 48
See application file for complete search history.

(56) References Cited

U.S. PATENT DOCUMENTS

| | | | | |
|---|---|---|---|---|
| 5,051,118 A * | 9/1991 | Andreae | ................. | B05B 14/43 95/268 |
| 5,352,257 A * | 10/1994 | Powers | .................. | B05B 14/46 55/444 |
| 5,846,303 A * | 12/1998 | Milojevic | ............. | B01D 50/40 96/323 |
| 5,976,225 A * | 11/1999 | Nystrom | ................ | B01D 46/84 55/525 |
| 6,328,778 B1 * | 12/2001 | Richerson | .......... | B01D 46/0002 55/482 |
| 6,585,793 B2 * | 7/2003 | Richerson | ............ | B01D 46/523 55/482 |
| 6,830,602 B2 * | 12/2004 | Norman | ................ | B01D 45/08 126/299 F |
| 9,993,835 B2 * | 6/2018 | Slama | .................... | B05B 14/43 |
| 10,675,580 B1 * | 6/2020 | Wyluda | .............. | B01D 46/0005 |
| 2004/0187774 A1 | 9/2004 | Guiduzzi et al. | | |
| 2005/0150201 A1 * | 7/2005 | Choi | ................... | B01D 46/523 55/499 |
| 2015/0209709 A1 | 7/2015 | Lazarevic et al. | | |
| 2024/0017197 A1 * | 1/2024 | Schumacher | ...... | B01D 46/2411 |

OTHER PUBLICATIONS

Search Report for corresponding PCT application No. PCT/EP2020/079278, mailed Nov. 18, 2020.

* cited by examiner

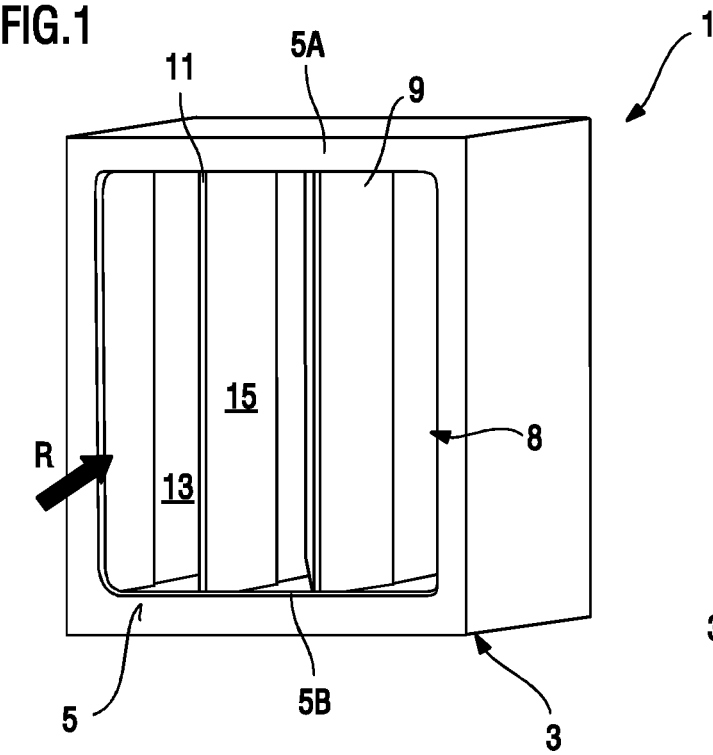
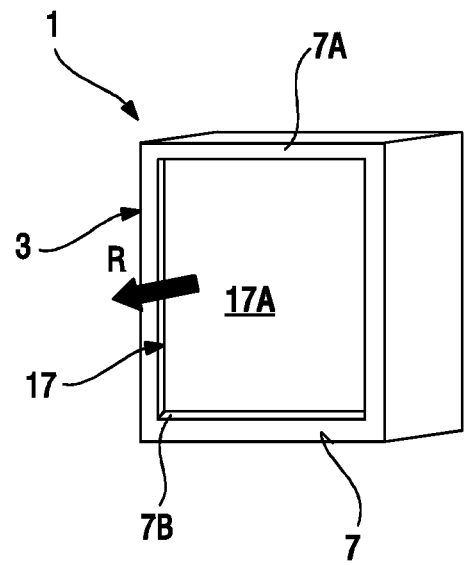
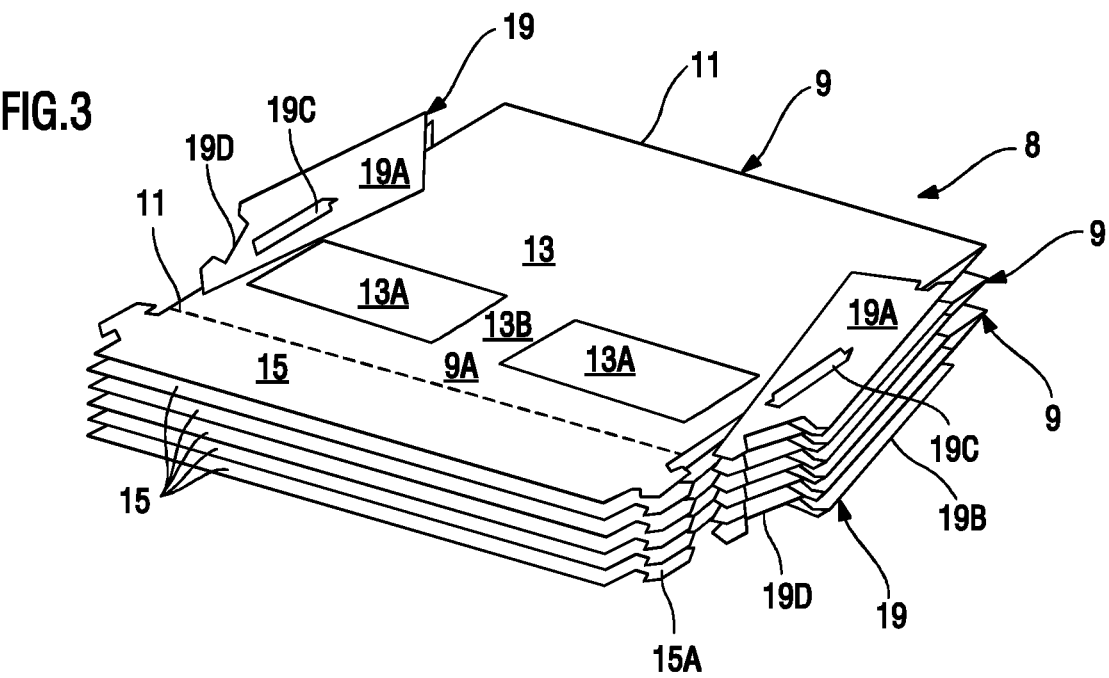

AIR FILTER FOR A PAINTING BOOTH USED FOR SPRAY COATING

The present invention is the US national stage under 35 U.S.C. § 371 of International Application No. PCT/EP2020/079278 which was filed on Oct. 16, 2020, and which claims the priority of application LU 101440 filed on Oct. 17, 2019, the contents of which (text, drawings and claims) are incorporated here by reference in its entirety.

FIELD

The present invention is directed to the field of painting booths for spray coating, and more particularly to air filtration systems for painting booths.

BACKGROUND

Spray coating is widely used for painting pieces or vehicles in industry. It consists in spraying on an object a variety of materials, such as paint, preferably in powder form, by means of a nozzle. The material then forms a uniform coating on the surface of the object. But spray coating has also severe drawbacks, such as paint fog formed by wet and/or dry paint aerosols. Thus, it is necessary to use an air filtration system in order to improve the user's personal safety.

The use of air filters for a painting booth is therefore well known and developed in industries. A painting booth generally consists in a closed down room, with an air outlet forming a wall, a roof or a floor, made of a plurality of individual air filters. Each filter comprises a housing forming an air inlet and an air outlet. A panel, designed to be generally accordion folded inside the housing, forms a filtrating barrier to paint particles. Those filters are able to keep sprayed materials with an efficiency within the range of 80% to 99%, depending on the form and/or the composition of the filter. But the filters of higher efficiency can generally hold less quantity of paint, and thus need to be changed more often.

Prior art patent document published WO 2018/140032 A1 discloses a cuboid-shaped filter for a painting booth, comprising a support with openings, the support forming an accordion panel. The accordion shape of the panel is maintained thanks to holding panels, fixed on both superior and inferior extremities of the accordion panel, said panel being positioned in a housing. Furthermore, the support comprises a filtrating material, preferentially made of a plurality of paper sheets. But this filter has a complex structure, which is difficult to manufacture. It shows also limitations in its filtration quality, capacity and resulting pressure loss.

SUMMARY

The present invention has for technical problem to provide a solution to at least one drawback of the above cited prior art. More specifically, the present invention has for technical problem to improve the quantity of paint material the filter is able to filter and contain, while keeping a satisfying filtration quality, a limited pressure loss and a limited cost.

For this purpose, the present invention is directed to an air filter for spray coating, comprising: a housing designed for showing a cuboid shape, with a face forming an air inlet and an opposed face forming an air outlet; one or more accordion panels with fold lines, to be accordion folded about the fold lines and to be located in the housing for forming a filtering barrier; remarkable in that the one or more accordion panels of the filtering barrier comprises at least one pair of flap portions configured to be folded to form a converging profile followed aeraulically by a trapping chamber formed by one of the accordion panels, and openings forming escape lateral passages of the trapping chamber(s).

Advantageously, each air inlet face and air outlet face of the housing comprises a frame and a central opening, the frame enabling each barrier to be maintained in the housing.

Advantageously, the air filter is in a flat configuration, needing to be folded and assembled for becoming operative.

According to an exemplary embodiment, the openings are adjacent to the corresponding flap portions so as to be distant from a bottom of the corresponding trapping chamber.

According to an exemplary embodiment, each of the at least one pair of flap portions is formed by end portions of one of the one or more panels.

According to an exemplary embodiment, each of the at least one trapping chamber is formed by two folded main portions of one of the one or more panels, with an angle greater than 30° and/or less than 60°.

According to an exemplary embodiment, each of the at least one trapping chamber comprises two of the openings formed in the two folded main portions, respectively, of one of the one or more panels.

According to an exemplary embodiment, each of the openings is sub-divided along a direction of the fold lines into two sub-openings separated by a portion of the one or more accordion panels.

According to an exemplary embodiment, the air filter further comprises two holding panels to extend perpendicularly to the fold lines and to engage with opposed ends, respectively, of the one or more accordion panels so as to hold the one or more accordion panels in a stable folded configuration.

Advantageously, each holding panel presents a folded accordion form, the folding being made upon fold lines, so as to form a holding panel able to maintain each accordion panel in a folded position.

According to an exemplary embodiment, the two holding panels comprise slots or notches for receiving tabs or protruding portions at the opposed ends, respectively, of the one or more accordion panels.

Advantageously, each main panel comprises a tab, which is able to enter a corresponding slot on the holding panel; each flap portion comprising a protruding portion, which is able to be inserted in a corresponding notch made on a corresponding holding panel.

According to an exemplary embodiment, the one or more accordion panels and, if present, the two holding panels, form a continuous guiding surface of the air.

According to an exemplary embodiment, the filtering barrier is an inlet filtering barrier to be arranged directly downstream of the air inlet, the air filter comprising an outlet filtering barrier to be arranged directly upstream of the air outlet, the outlet filtering barrier comprising a frame and a layer of fibrous filtering material carried by the frame.

According to an exemplary embodiment, the air filter further comprises an intermediate filtering barrier comprising a filtering panel with fold lines and configured to be accordion folded along the fold lines.

According to an exemplary embodiment, the filtering panel of the intermediate filtering barrier comprises a perforated panel and a layer of fibrous filtering material carried by the perforated panel.

According to an exemplary embodiment, the intermediate filtering barrier comprises a cross member configured for engaging with the fold lines of the filtering panel located on a rear face of the intermediate filtering barrier when the filtering panel is accordion folded, in order to maintain constant a distance between the fold lines on the rear face.

According to an exemplary embodiment, the intermediate filtering barrier is configured to be located in the housing between the inlet filtering barrier and the outlet filtering barrier.

According to an exemplary embodiment, the housing, the one or more accordion panels, the two holding panels, if present, the perforated panel, if present, and/or the cross member, if present, are made of cardboard.

The present invention is interesting in that it improves the quantity of paint material the filter is able to filter and contain, while keeping a satisfying filtration quality, a limited pressure loss and a limited cost. Indeed, in an exemplary embodiment, the present invention increases the efficiency of retention of paint particles by the air filter up to 99.45%, thanks to the use of three different barriers in the filter. Each air filter of the present invention also permits a retention of more than 30 kg of paint, thus enabling an economy use in filters, since less change of filters will be necessary. This enables an important cost lowering while using those filters. Each air filter according to various embodiments of the present invention can also be folded for transport, thus enabling lower costs of transport, and lowering the total cost of the filter. Further, it is easy and quick to install in the paint booth. The materials needed for the installation are well known by the skilled person. Finally, the materials used for its fabrication are low cost, and recyclable.

DRAWINGS

Other features and advantages of the present invention will be readily understood from the following detailed description and drawings among them.

FIG. 1 is a front view showing the air inlet of an air filter according to an exemplary embodiment of the present invention.

FIG. 2 shows a back view of the air outlet of the air filter of FIG. 1 according to an exemplary embodiment of the present invention.

FIG. 3 is a folded view of a filtering barrier made of accordion panels and holding panels according to an exemplary embodiment of the present invention.

DETAILED DESCRIPTION

Figure 4:
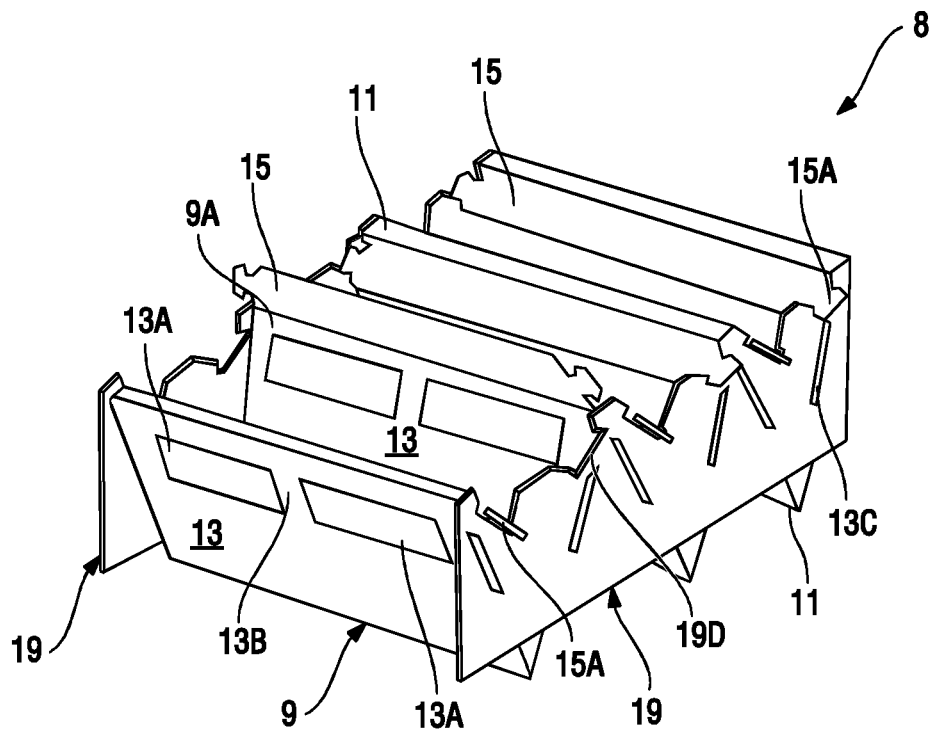
FIG. 4 is a perspective lateral view of the filtering barrier of FIG. 3 according to an exemplary embodiment of the present invention.

FIGS. 1 and 2 show two different views of an air filter according to various embodiments of the present invention.

The air filter 1 comprises a housing 3, in various instances made of cardboard, and designed for showing a cuboid shape. This shape is in various instances chosen because it is the most widely made for filters used in painting booth, and, for example, used for spray coating. The housing 3 of the air filter 1 comprises a face 5 forming an air inlet and an opposed face 7 forming an air outlet. The air flow is shown in the Figures by thick arrows with the reference "R". Each face (5, 7) of the housing 3 is composed of a frame (5A, 7A) with a central opening (5B, 7B). The frame (5A, 7A) of both faces (5, 7) allows each barrier to be kept within the housing 3. From the central opening 5B of the face 5 a filtering barrier 8 is visible, and, more particularly, one or more accordion panels 9 of the filtering barrier 8. In various instances, the air filter 1 comprises more than one accordion panel 9, positioned successively beside each other in the housing 3.

Each accordion panel 9 comprises fold lines 11, which enable the panel 9 to be accordion folded in order to be positioned in the housing 3. Those fold lines 11 can be perforated lines or equivalent, and made to weaken the material, thus enabling the panel 9 to be folded. The accordion panel 9 is made by two main portions 13 and at least one pair of flap portions 15. The filtering barrier 8 in various instances comprises three successive accordion panels 9, thus six main portions 13 and six flap portions 15, with nine fold lines 11.

The opposed face 7 of the housing 3 shows, in its central opening 7B, an outlet filtering barrier 17 made, essentially, of a single layer of a polyester material 17A.

Figure 5:
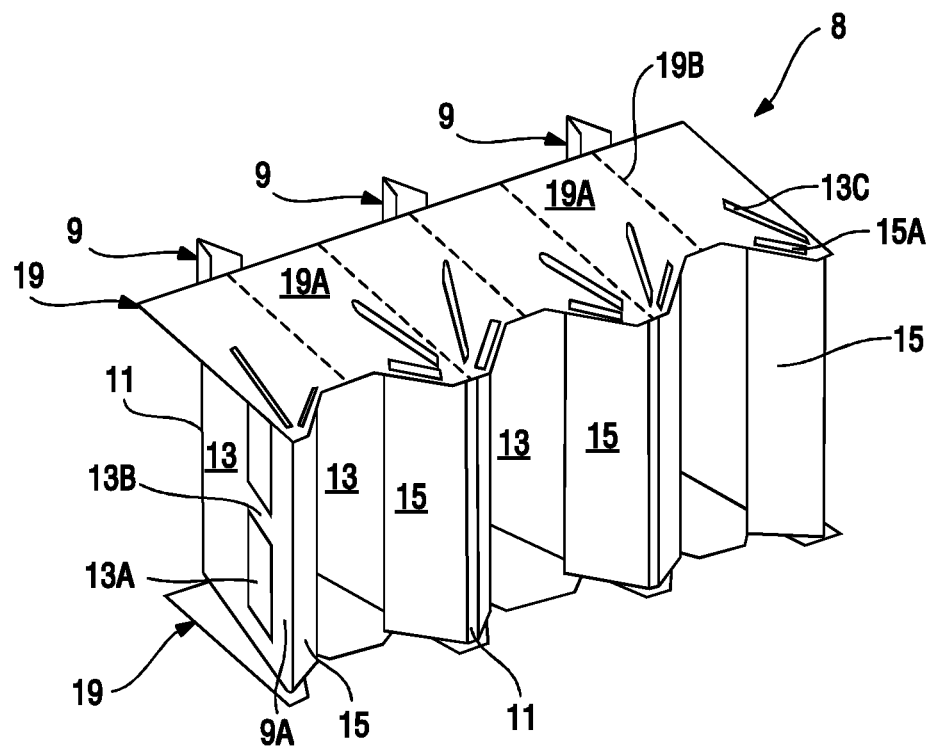
FIG. 5 is a perspective front view of the filtering barrier of FIGS. 3 and 4 according to an exemplary embodiment of the present invention.
Figure 6:
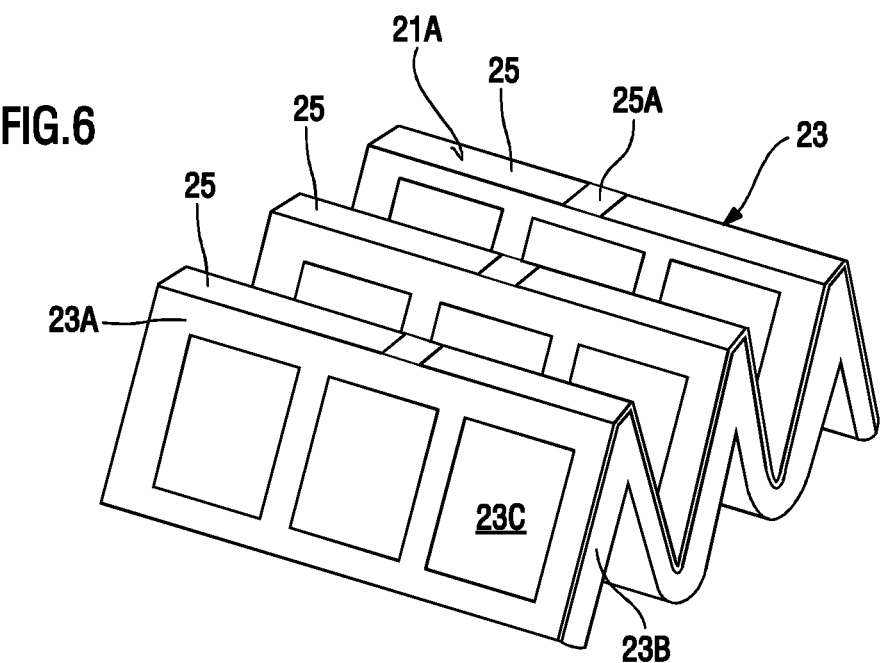
FIG. 6 is a perspective lateral view of a filtering panel for an intermediate filtering barrier according to an exemplary embodiment of the present invention.
Figure 7:
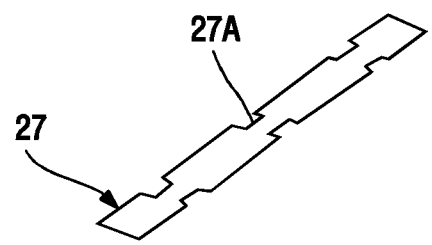
FIG. 7 is a perspective view of a cross member for the intermediate filtering barrier according to an exemplary embodiment of the present invention.
Figure 8:
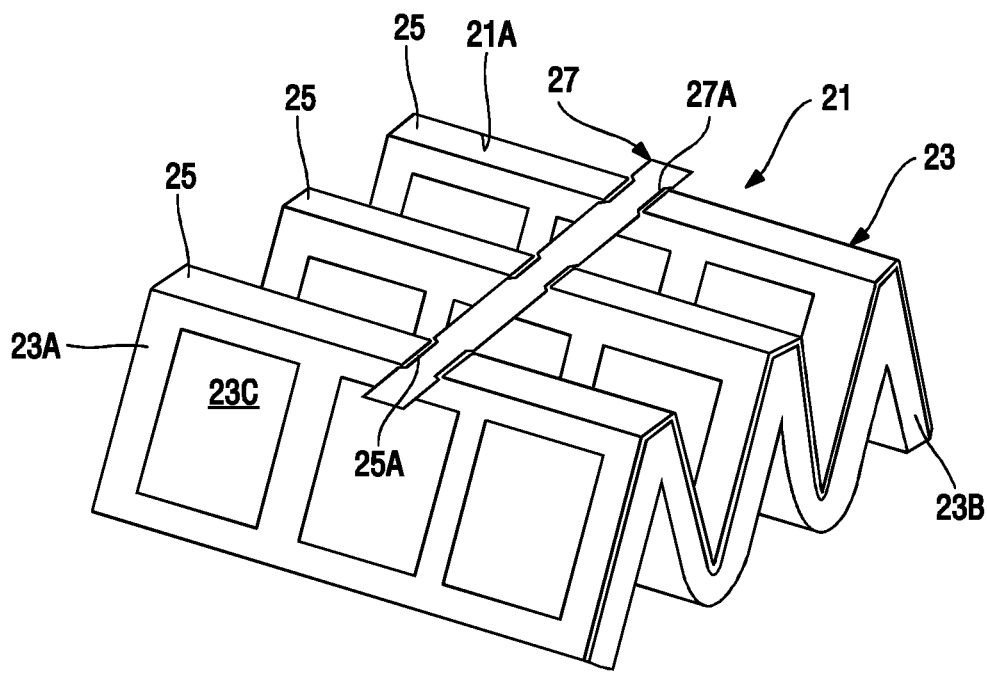
FIG. 8 is a perspective lateral view of the intermediate filtering barrier according to an exemplary embodiment of the present invention.
Figure 9:
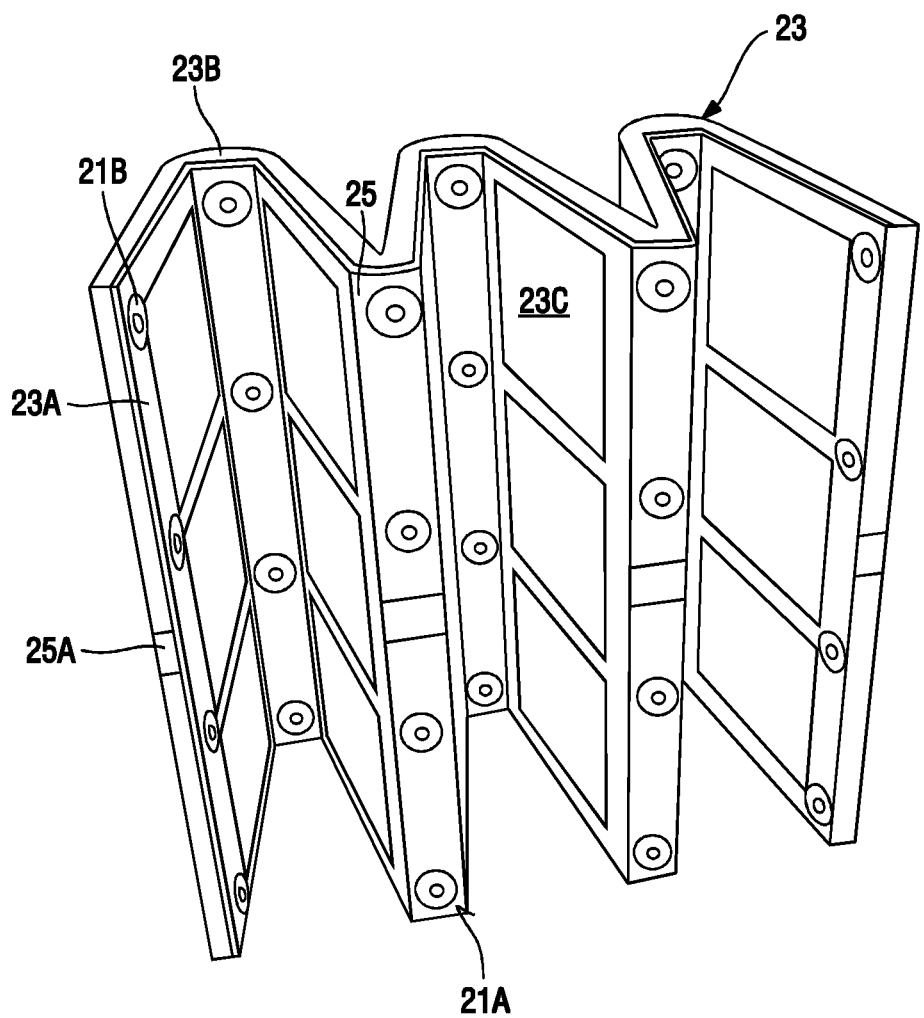
FIG. 9 is a rear view of the filtering panel of FIG. 6 according to an exemplary embodiment of the present invention.

FIGS. 3 to 5 show the filtering barrier according to various embodiments of the present invention.

The filtering barrier 8 comprises one or more accordion panels 9 and two holding panels 19. Each accordion panel 9 comprises two main portions 13 folded by a fold line 11, and a pair of flap portions 15 formed by end portions 9A of the panel 9, and, more precisely, by end portions of each main portion 13 constituting the panel 9. Each flap portion 15 is also hinged to the main portion 13 by a fold line 11. Advantageously, each free extremity of each flap portion 15 is oriented, once mounted in the housing (visible in FIGS. 1 and 2), toward the rear end of the housing, the flap portions 15 and the main portions 13 forming a converging profile.

Two successive main portions 13 are folded with an angle greater than 30° and/or less than 60°. Each main portion 13 comprises an opening, which is adjacent to the flap portions 15, the opening being in various instances sub-divided along a direction of the fold lines 11 into two sub-openings 13A, separated by a portion 13B of the respective main portion 13.

The filtrating barrier 8 also comprises two holding panels 19. Each holding panel 19 is made of successive longitudinal portions 19A, folded thanks to fold lines 19B, in order to take an accordion form easier to transport. Each longitudinal portion 19A comprises at least one slot 19C, which receives a corresponding tab 13C from a corresponding main portion 13. Each longitudinal portion 19A also comprises at least one notch 19D, which receives a corresponding protruding portion 15A of the corresponding flap portion 15. Each holding panel 19, after being mounted on the accordion panel 9 to form the filtering barrier 8, extends perpendicularly to the fold lines 11 and engages with opposed ends, respectively, of the accordion panels 9. The holding panels 19 are used to hold the accordion panels 9 in a stable folded configuration. Also, the accordion panels 9 and the two holding panels 19 form a continuous guiding surface of the air.

FIGS. 6 to 9 disclose different views of an intermediate filtering barrier according to various embodiment of the present invention.

The presence of the intermediate filtering barrier 21 increases the efficiency and the retention of paint by the filter of the present invention. But, in some embodiments, such as a lower sized filter, the intermediate barrier 21 can be absent. The intermediate barrier 21 comprises a filtering panel 23 with fold lines 25, the panel 23 being configured to be accordion folded along the fold lines 25. The filtering panel 23 comprises a perforated panel 23A and a layer of fibrous material 23B carried by the perforated panel 23A. The perforated panel 23A comprises several orifices 23C, the layer of fibrous material 23B being in various instances made of a polyester fiber, its thickness being comprised between 15 mm to 25 mm. The intermediate filtering barrier 21 also comprises a cross member 27 with notches 27A positioned at equal distance from one another. This cross member 27 is configured for engaging with the fold lines 25 of the filtering panel 23, and, more especially, with the fold lines 25 located on a rear face 21A of the intermediate barrier 21 when the filtering panel 23 is folded. The cross member 27 is made for insertion in corresponding notches 25A, positioned in the corresponding fold lines 25 of the filtering panel 23, those notches 25A corresponding to the notches 27A positioned on the cross member 27. Thus, the cross member 27 cannot easily be displaced, maintaining a constant distance between each fold line 25 on the rear face 21A. The layer of fibrous filtering material 23B is fixed on the perforated panel 23A by fixing means 21B. The perforated panel 23A and the cross member 27 are in various instances made of cardboard.

Figure 10:
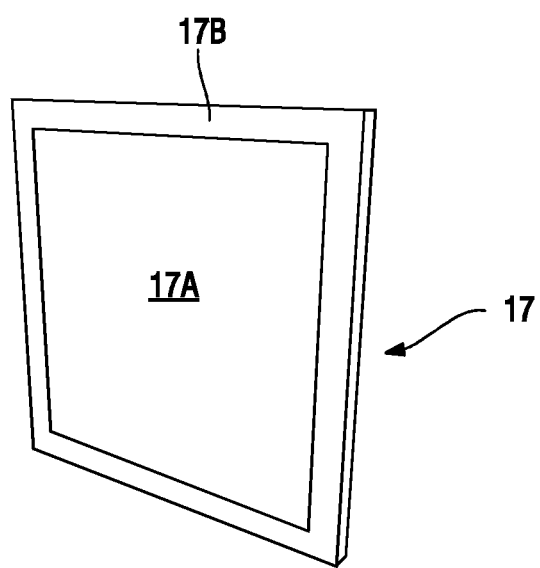
FIG. 10 is a rear view of an outlet filtering barrier according to an exemplary embodiment of the present invention.

FIG. 10 shows a perspective view of the outlet filtering barrier according to various embodiments of the present invention.

This outlet filtering barrier 17 comprises a frame 17B on which is mounted the layer of fibrous material 17A. This outlet filtering barrier 17 is arranged directly upstream of the air outlet. The frame 17B of the outlet filtering barrier 17 is in various instances made of cardboard, the layer of fibrous material 17A being in various instances made of polyester.

Figure 11:
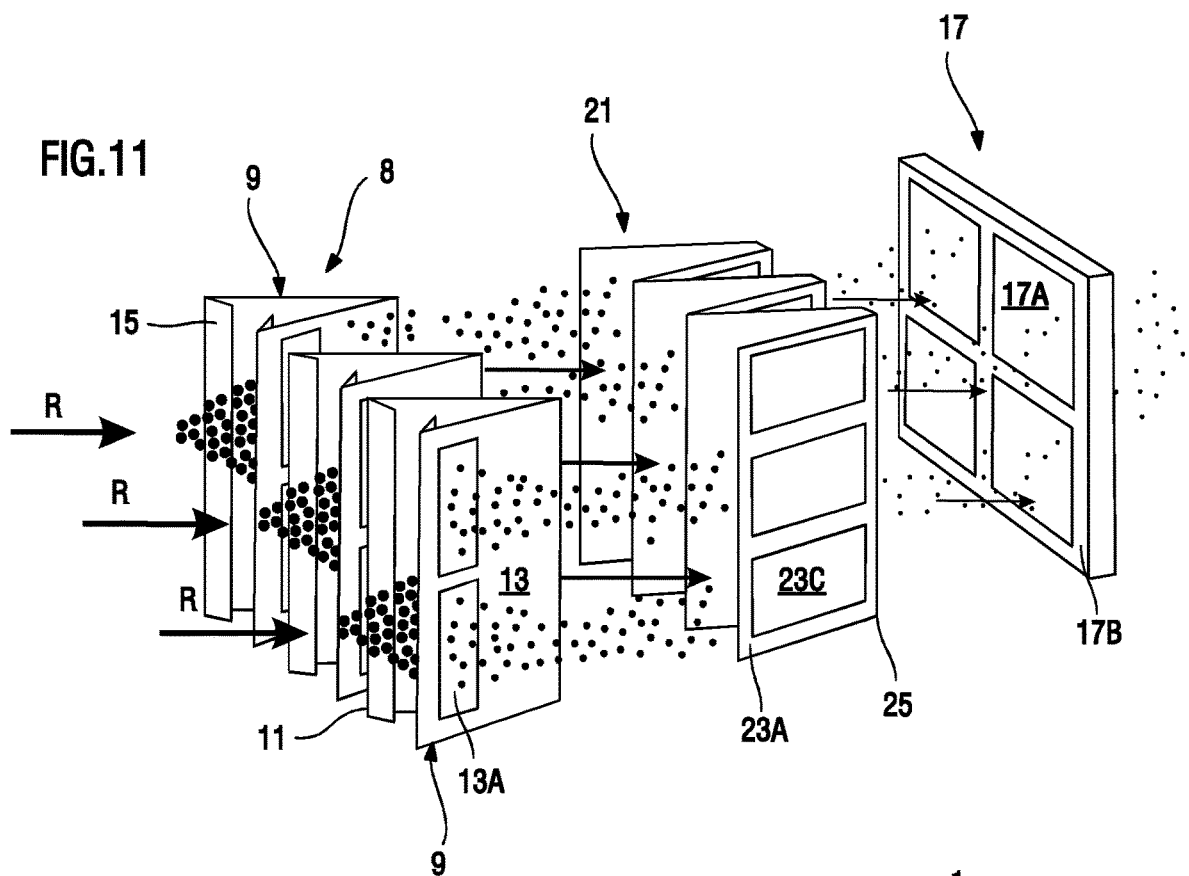
FIG. 11 shows a schema of the air filter operating principle according to an exemplary embodiment of the present invention.
Figure 12:
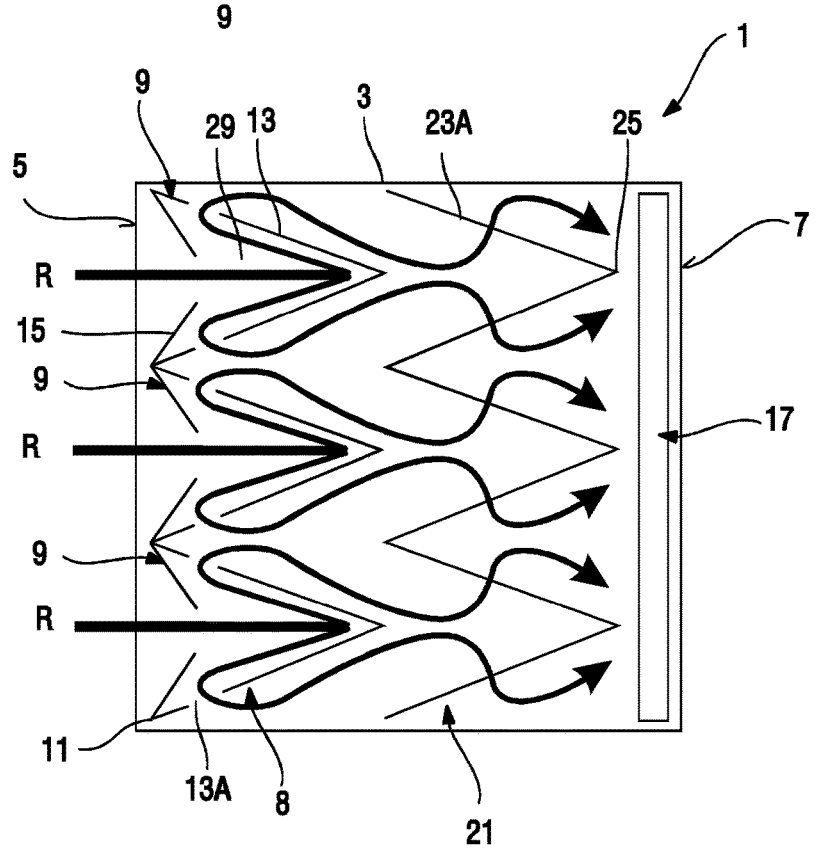
FIG. 12 shows a schema of the air flow within the air filter according to an exemplary embodiment of the present invention.

FIGS. 11 and 12 represent two schemas of the filtrating system according to various embodiments of the present invention. Those are also described in correlation with the FIGS. 1 to 10, previously described.

In the housing 3, the accordion panels 9, with its main portions 13 and flap portions 15, are positioned near the air inlet of the filter 1. The flap portions 15 and the main portions 13 of each accordion panel 9 form a trapping chamber 29. Each trapping chamber 29, formed by one accordion panel 9, has sub-openings 13A positioned on the main portions 13, the sub-openings 13A forming escape lateral passages of the trapping chambers 29. The flap portions 15, positioned near the air inlet, are at a distance from a bottom of the corresponding trapping chamber 29. Each trapping chamber 29 is formed by two folded main portions 13. This first filtering barrier 8 enables the capture of up to 74% of paint particles.

The intermediate filtering barrier 21 is positioned in the housing 3 between the inlet filtering barrier 8, forming the accordion panels 9, and the outlet filtering barrier 17. The layer of fibrous material 23B is oriented toward the inlet filtering barrier 8, the cross member 27, and thus the rear face 21A of the intermediate filtering barrier 21 being positioned toward the outlet filtering barrier 17 of the filter 1. This barrier 21 enables the capture of up to 24% of the remaining paint particles.

The outlet filtering barrier 17 is positioned after the intermediate barrier 21. It enables the capture of the last paint particles, so that 99,8% of pure air escapes the air filter 1.

The air R, fortified with paint particles, enters the filter 1 between the flap portions 15, through the face 5 of the filter 1. The air R is mostly directed to the bottom of each trapping chamber 29. The air R is then redirected to the sub-openings 13A of each main portion 13 of the filtering barrier 8, the sub-openings 13A being positioned under the flap portions 15. Thus, the air R is directed to the intermediate barrier 21, where it passes between the holes of the layer of fibrous material 23B, positioned on one side of the perforated panel 23A. The air R is then directed to the outlet filtering barrier 17, where it can cross the layer of fibrous material 17A, thus removing most of the remaining paint particles. The air R can then leave the paint booth, free of paint particles.

An exemplary method for mounting the air filter 1. In various embodiments, this method is described in correlation with FIGS. 1 to 12. The air filter 1 is in various instances in a flat configuration, and needs to be folded and assembled to become operative.

In a first exemplary embodiment: the air filter 1 comprises two barriers, the filtering barrier 8 and the outlet filtering barrier 17.

Firstly, the housing 3 is unfolded, so as to form a cuboid shape.

Secondly, the filtering barrier 8 is mounted. Each holding panel 19 and accordion panel 9 are unfolded. Each tab 13C of each main portion 13 is inserted in a corresponding slot 19C of the corresponding holding panel 19. Then, each flap portion 15 is folded on the fold lines 11, so that each protruding portion 15A is inserted in a corresponding notch 19D of the holding panel 19. The filtering barrier 8 is then inserted in the housing 3, so that the flap portions 15 are positioned near the face 5 of the housing 3.

Thirdly, the outlet filtering barrier 17 is inserted after the filtering barrier 8, then the housing 3 is closed. The air filter 1 is subsequently ready for use.

In a second exemplary embodiment: the air filter 1 comprises the three barriers according to various embodiments of the present invention.

Firstly, the housing 3 is unfolded, so as to form a cuboid shape.

Secondly, the outlet filtering barrier 17 is inserted in the housing 3.

Thirdly, the intermediate filtering barrier 21 is folded so as to form an accordion. The cross member 27 is then inserted in the notches 25A present in each fold line 25 of the filtering panel 23. The intermediate filtering barrier 21 is then inserted in the housing 3, so that the cross member 27 is oriented toward the rear end of the housing 3.

Fourthly, the filtering barrier 8 is mounted. Each holding panel 19 and accordion panels 9 are unfolded. Each tab 13C of each main portion 13 is inserted in a corresponding slot 19C of the corresponding holding panel 19. Then, each flap portion 15 is folded on the fold line 11, so that the protruding portion 15A is inserted in a corresponding notch 19D of the holding panel 19. The filtering barrier 8 is then inserted in the housing 3, so that the flap portions 15 are positioned near the face 5 of the housing 3. Then the housing 3 is closed, the air filter 1 is therefore ready for use.

The invention claimed is:

1. An air filter for spray coating, said air filter comprising:
    a housing designed for showing a cuboid shape, with a face forming an air inlet and an opposed face forming an air outlet; and
    one or more accordion panels with fold lines, to be accordion folded about the fold lines and to be located in the housing for forming a filtering barrier;
    wherein the one or more accordion panels of the filtering barrier comprises at least one pair of flap portions formed by end portions of one of the one or more accordion panels, configured to be folded to form a converging profile followed aeraulically by a trapping chamber formed by two folded main portions of the accordion panel, and openings forming escape lateral passages of the trapping chamber(s).

2. The air filter according to claim 1, wherein the openings are adjacent to the corresponding flap portions so as to be distant from a bottom of the corresponding trapping chamber.

3. The air filter according to claim 1, wherein for each of the at least one trapping chamber, the two folded main portions of one of the one or more accordion panels form an angle being at least one of:
    greater than 30°; and
    less than 60°.

4. The air filter according to claim 1, wherein each of the at least one trapping chamber comprises two of the openings formed in the two folded main portions, respectively, of one of the one or more accordion panels.

5. The air filter according to claim 1, wherein each of the openings is sub-divided along a direction of the fold lines into two sub-openings separated by a portion of the one or more accordion panels.

6. The air filter according to claim 1, further comprising two holding panels to extend perpendicularly to the fold lines and to engage with opposed ends, respectively, of the one or more accordion panels so as to hold the one or more accordion panels in a stable folded configuration.

7. The air filter according to claim 6, wherein the two holding panels comprise slots or notches for receiving tabs or protruding portions at the opposed ends, respectively, of the one or more accordion panels.

8. The air filter according to claim 1, wherein the one or more accordion panels and, if present, the two holding panels, form a continuous guiding surface of the air.

9. The air filter according to claim 1, wherein the filtering barrier is an inlet filtering barrier to be arranged directly downstream of the air inlet, the air filter comprising an outlet filtering barrier to be arranged directly upstream of the air outlet, the outlet filtering barrier comprising a frame and a layer of fibrous filtering material carried by the frame.

10. The air filter according to claim 1, further comprising an intermediate filtering barrier comprising a filtering panel with fold lines and configured to be accordion folded along the fold lines.

11. The air filter according to claim 10, wherein the filtering panel of the intermediate filtering barrier comprises a perforated panel and a layer of fibrous filtering material carried by the perforated panel.

12. The air filter according to claim 10, wherein the intermediate filtering barrier comprises a cross member configured for engaging with the fold lines of the filtering panel located on a rear face of the intermediate filtering barrier when the filtering panel is accordion folded, in order to maintain constant a distance between the fold lines on the rear face.

13. The air filter according to claim 10, wherein the intermediate filtering barrier is configured to be located in the housing between the filtering barrier being an inlet filtering barrier to be arranged directly downstream of the air inlet, and an outlet filtering barrier to be arranged directly upstream of the air outlet.

14. The air filter according to claim 1, wherein the housing and the one or more accordion panels are made of cardboard.

* * * * *